Nov. 18, 1941. J. S. KAMBORIAN 2,263,337
METHOD OF AND APPARATUS FOR USE IN ASSEMBLING PARTS
Filed Aug. 15, 1940
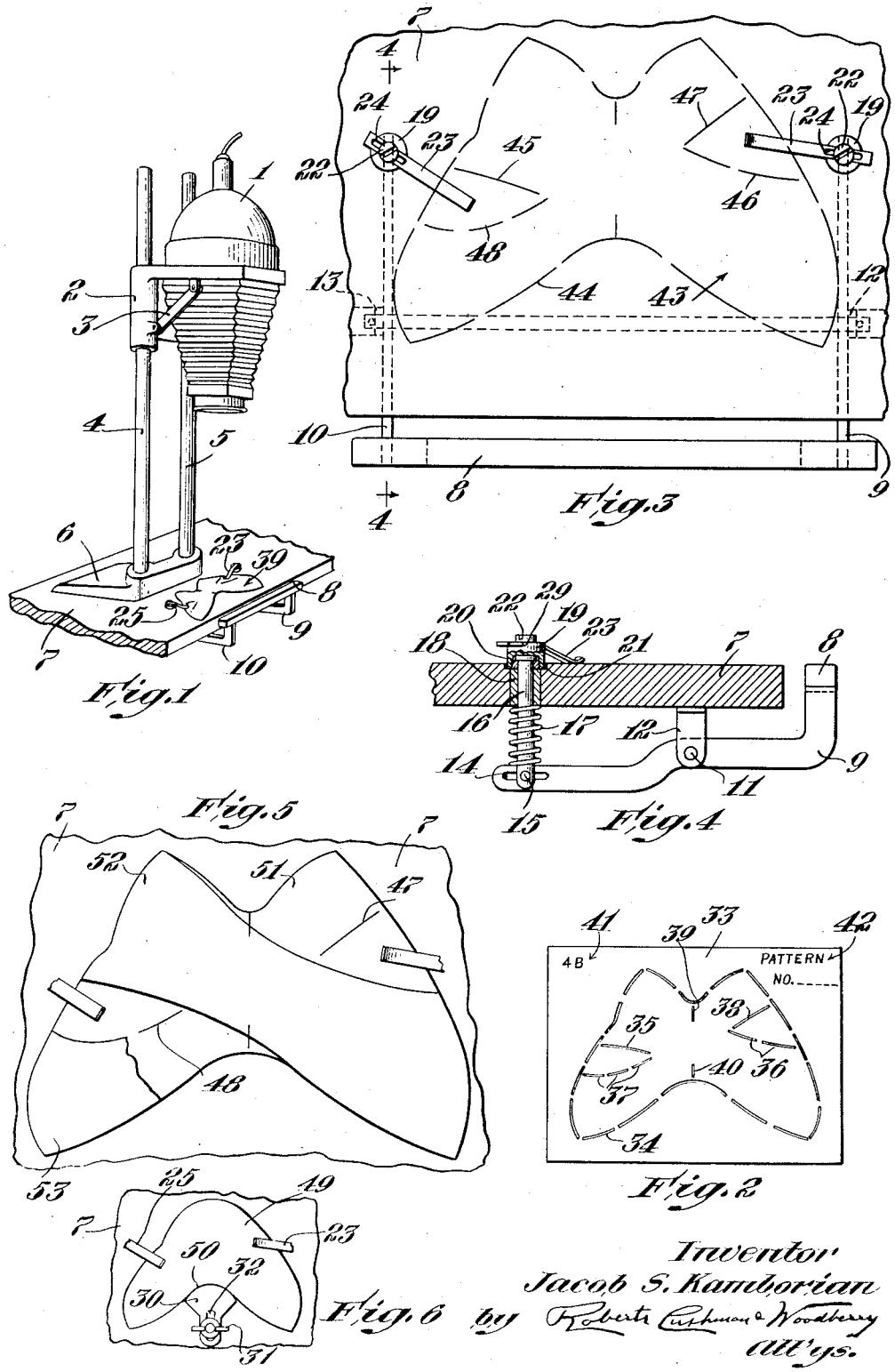
Inventor
Jacob S. Kamborian
by Roberts Cushman & Woodberry
Att'ys.

UNITED STATES PATENT OFFICE 2,263,337

METHOD OF AND APPARATUS FOR USE IN ASSEMBLING PARTS

Jacob S. Kamborian, West Newton, Mass.

Application August 15, 1940, Serial No. 352,825

18 Claims. (Cl. 12—52)

This invention pertains to the art of positioning figures, elements or parts relative to one another and more particularly to a method of and apparatus for positioning of shoe elements relative to one another in assembling said elements into shoe uppers.

The principal object of the invention is to provide a method of and apparatus for locating figures, elements or parts relative to each other in a facile and efficient manner. Another object is to provide a method of and apparatus for positioning figures, elements or parts in respect to one another in the operation of attaching said figures, elements or parts together without the use of guiding means which leave any permanent mark or impression upon the figures, elements or parts. A further object is to provide a means of indicating the location of elements or parts of composite bodies relative to each other without placing any physical mark upon the elements or parts. Other objects of the invention will be apparent from a consideration of the following specification taken in conjunction with the accompanying drawing.

This invention is of utility in many industries in which it has heretofore been the practice to place guide marks on figures, elements or parts to aid in locating other figures, elements or parts relative thereto, and is of particular utility in the manufacture of shoes in assisting in assembling shoe parts into uppers. In the usual method of manufacturing shoes, the elements to be assembled into an upper are stamped or cut from leather or other material in the cutting room of the factory and then taken to the stitching room where they are stitched together to form shoe uppers. It is customary—particularly in the manufacture of medium and high-grade women's novelty shoes and of certain kinds of fancy cut men's shoes—to place lines near the edge of the elements of leather or fabric to guide an operator as he fastens adjacent elements together. Other lines are placed upon the elements in any desired location to guide the operator in superimposing one element upon another. For example, a line is made near the edge of a vamp to guide an operator in attaching a tip to the vamp, and other lines are made inwardly from the edge of the vamp to guide an operator in placing parts such as vamp saddles in proper position relative to the vamp. In some instances it is found desirable to place further marks upon the shoe element to indicate the proper relative location of fancy stitching.

In the common procedure, the elements are marked by either a die marking machine or by hand marking. In cases where the marks do not form a complicated design, such as a mark around the edge of a vamp to guide the positioning of the tip, a die is made having the proper size and contour, the die is placed in a marking machine, the vamp is properly located on the work table, and the die is forced into contact with the vamp so as to leave a mark upon the vamp. However, if the desired marks form a complicated design, the making of the die presents practical difficulties and causes the operation to become excessively costly. Therefore, it is found to be more advantageous to place these marks upon the elements by a hand operation in which an operative places a properly designed pattern upon an element and follows around the contour of the pattern with a pen.

In some factories, the marked elements are assembled into uppers by stitching them together, the proper alignment of the work depending upon the skill of the operator in holding the elements in proper relation to each other in accordance with the guide lines while presenting the work to the stitching machine. It is becoming increasingly common, however, to attach the elements together to form a shoe upper prior to the stitching operation. This is usually accomplished by placing a marked element upon a work table and fastening other elements thereto by means of adhesive in accordance with the markings. This method of assembly is particularly useful in attaching appliques, overlays, saddles, or inserts either to the outer parts or to the linings of shoes prior to the stitching operation. This process permits better aligning of the work than is possible when the elements are stitched together without any prior attaching operation.

The present invention is particularly designed to simplify the common process of assembling shoe parts into uppers, as described above, by eliminating the placing of guide marks upon the shoe elements. This is accomplished by providing a method of and apparatus for projecting thin beams of light upon a shoe element, said thin beams of light forming an optical image or pattern upon the shoe element which acts as a guiding means to direct the operator in assembling the elements and attaching them together by means of adhesive.

In practicing one embodiment of my invention, I provide a work table equipped with a hold-down device for clamping the work in any desired location, a means for projecting a beam of light upon the work table, and a light transmitting screen, film or pattern for intercepting the path of the beam of light so as to cast an optical pattern or image upon the surface of the work table or upon work placed thereon.

The accompanying drawing is illustrative of certain embodiments of my invention, but is not intended to limit the scope of the invention as defined within the appended claims.

Fig. 1 is a perspective view showing a projecting device mounted above a work table;

Fig. 2 is a plan view showing a sheet of material having a pattern therein which is useful in practicing the present method;

Fig. 3 is an enlarged fragmentary plan view showing a projected image on the surface of a work table;

Fig. 4 is a fragmentary section on the line 4—4 as shown in Fig. 3;

Fig. 5 is a plan view showing a fragment of a work table having positioned thereon certain shoe elements arranged relative to each other in accordance with the present method; and Fig. 6 is a plan view showing a fragment of a work table having a gauging means thereon to guide the initial locating of a shoe element on the table.

Referring particularly to Fig. 1, the numeral 1 designates a projecting device, such as an electrical lantern, suitably supported by a bracket 2 which is strengthened by means of the angle braces 3, said bracket 2 being slidably mounted on the vertical supporting bars 4 and 5. The vertical supporting bars 4 and 5 are removably attached to the base plate 6 which is mounted on the surface of a work table 7. Although the projecting device shown here is rigidly mounted such that the plane of the screen or pattern is parallel to the plane of the surface of the work table, it may be preferable, in some applications, to tiltably mount the projecting device by means of a hinged bracket adjustably supported by bracket arms, said bracket arms being arranged so that their total length may be varied as desired. The particular means of mounting the projecting device shown herein is merely illustrative of the invention and is not a limitation upon it as it may be equally desirable and is within the scope of the invention to support said projecting device by means of members depending from an overhead support or in any other suitable manner.

The work table 7 is equipped with a device for retaining the work in fixed relation thereto comprising a hold-down device shown herein (Figs. 1, 3 and 4) as a clamping mechanism including a cross bar 8 attached to lever arms 9 which are pivotally mounted on a horizontal shaft 11, said shaft being supported by depending hangers 12 and 13. The rearward end of each lever arm 9 is movably attached to a vertical lifting rod 16 by means of a pin 15 passing through the rod 16 and a slot 14 in the lever arm 9. The vertical lifting rod 16 passes slidably through a bushing 18 set in the work table 7. A compression spring 17, having one end bearing against the lower end of the bushing 18 and the other end bearing against the upper surface of the lever arm 9, is arranged about the rod 16 so as to exert a force against the lever arm 9 in a direction away from the plane of the work table. The rod 16 is equipped with an externally screw-threaded head 20 which normally bears against the upper end of the bushing 18 so as to oppose the downward travel of the rod 16 under the force exerted by the spring 17. A hub 19 having internally threaded sockets in each end is attached to the head 20 of the rod 16 by means of the interaction of the respective internal and external screw threads and is fitted into a circular depression 21 in the surface of the work table. A clamping spring 23 having one end bearing on the surface of the work table is adjustably arranged in a slot 29 in the upper surface of the hub 19 and is held in proper relation thereto by means of a screw 22 passing through a slot 24 in the body of the clamping spring 23.

The position of the clamping spring 23 relative to work placed upon the work table is adjustable both angularly about the axis of the vertical rod 16 and transversely toward or away from the axis of said rod. The angular adjustment is easily made by rotating the hub 19 about the head 20 of the vertical rod 16. The transverse position is controlled by loosening the screw 22, sliding the clamping spring 23 either inwardly or outwardly until it is of the desired length beyond the axis of the vertical rod 16, and locking said clamping spring 23 firmly in place by tightening the screw 22. Thus the position of the clamping springs can be easily varied to suit the different requirements resulting from the necessity of holding work of various shapes and sizes firmly to the work table.

In some cases it is preferable to assist the initial locating of a shoe part by means of a work rest such as is shown in Fig. 6 in which the numeral 30 designates a work positioning block held in adjustable relation to the work table 7 by means of a wing bolt 31 which passes through a slot 32 in the work block 30 into a threaded socket, not shown, in the work table. As illustrative of one use of this work positioning block I have shown a full vamp 49 in proper position on the work table with its inside vamp line against the outer edge 50 of the work block 30. The vamp is held in desired location relative to the work table by any suitable means, as for example clamping springs 23 whose actuating mechanism has been disclosed heretofore.

Although I have shown a work block constructed and arranged to assist in locating a vamp in proper position it is understood that work blocks of slightly different shape may be substituted therefor which may be better suited to positioning elements of shoes other than vamps. It is further pointed out that in dealing with some elements of shoes it may be desirable to place the work block to the rear of the work or in some other location relative to the work instead of in the front of the work as is shown in Fig. 6.

When it is desired to hold an element of work firmly on the work table, the operator depresses the crossbar 8 which causes the lever arms 9 to move pivotally about the shaft 11. This results in the lifting of the vertical rods 16, the hubs 19, and the clamping springs 23, thus moving the latter members out of contact with the surface of the work table 7, and at the same time compressing the springs 17. While the clamping springs 23 are thus lifted from the table, the work is properly located according to a method described hereinafter. The operator then releases the crossbar 8 and the clamping springs 23 are drawn down into contact with the work holding it firmly against the surface of the work table 7 by the force exerted by the expansion of the springs 17.

In utilizing this apparatus in assembling elements of shoes into an upper, a light transmitting pattern, screen or film is placed in the projecting device in such a way as to cast an optical image of the pattern toward the surface of the work table. The patterns for use in this device may be of any desired kind and may be prepared in any suitable manner. Fig. 2 is illustrative of one of the preferred kinds of pattern 33 such as a sheet of material of a predetermined length and breadth suitable for fitting into the screen holder of the projecting device 1. The sheet 33 is provided with incisions 34 and a series of incisions 35, 36, 37 and 38 in a predetermined location relative to the contour incisions 34. In the particular pattern shown in Fig. 2, the incisions 34 represent the contour of an open toe vamp lining while the incisions 35, 36, 37 and 38 indicate the proper relative position thereto of the vamp saddles.

It is often desirable to place more permanent guiding marks upon the work to assist the laster in properly aligning the upper upon the last. This can be easily accomplished in conjunction with this assembling operation by casting optical marks upon the work by means such as the incisions 39 and 40 in the pattern sheet 33 herein described and placing permanent marks upon the work in accordance with the image of those incisions.

In the preferred embodiment of this invention the design incised in the sheet of material will be of substantially the exact size and contour of the shoe elements, but in some instances it may be desirable to utilize a pattern of a proportionately larger or smaller size, correcting for this difference between the size of the pattern and the size of the shoe elements by any means well known in the photographic art. In other cases it may be desirable to prepare photographic negatives or positives to use as patterns in the projecting device.

Although the above described patterns are the preferred embodiments of this invention, it is to be understood that the patterns may be made of any light transmitting material which is capable of transmitting both white light and any component thereof through any desired areas of the material. It is also found to be desirable, though not essential to the invention to include markings, such as shown at 41 and 42 in Fig. 2, on the patterns which identify the particular pattern according to the size and style of shoe to which it is applicable.

This invention is carried out with the illustrated embodiment by placing the pattern 33 shown in Fig. 2 in the projecting device and projecting light through the design incised thereon toward the work table, thereby casting upon the work table an image of substantially the exact size and shape of the shoe elements which are to be assembled, said optical image being indicated in Fig. 3 by the numeral 43. In this optical image 43, the numeral 44 indicates the illuminated image of the contour of a shoe element, said illuminated image 44 being formed by the passage of light through the incisions 34 in the sheet of material 33. The illuminated lines 45, 46, 47 and 48 also appearing in the image 43 are formed by the passage of light through the respective incisions 35, 36, 37 and 38 in the material 33.

In utilizing this optical image 43, as shown in Figs. 1 and 3, as a means of directing the assembling of shoe parts, the bar 8 is depressed, actuating the mechanism for lifting the clamping springs 23, the clamping springs are lifted from the work table 7, a vamp lining, such as shown at 51 in Fig. 5, is positioned upon the work table 7 in accordance with the contour 44 of the optical image 43, and the bar 8 is released to permit the clamping springs 23 to descend upon the vamp lining 51, so as to anchor said vamp lining firmly to the work table 7.

After correctly locating and anchoring the vamp lining 51 in register with the optical image 43 the vamp saddles are coated with adhesive. The projected guiding lines 45, 46, 47 and 48 now appear upon the vamp lining and are used in locating the vamp saddles 52 and 53. The vamp saddle 52 is then placed in proper position relative to the vamp lining 51 by means of the illuminated guiding lines 45 and 46 and the vamp saddle 53 is located in conformity with the projected guide lines 47 and 48 upon said vamp lining 51. In Fig. 5 the vamp saddle 53 is cut away to show clearly the projected guiding lines 47 and 48 upon the vamp lining 51.

In using the work block 30 the procedure is similar to that described above. It is necessary, however, to adjust the work block so that its work positioning edge 50 is in conformity with the projected contour 44 of the shoe element. The procedure thenceforth has been described heretofore.

My invention, described in detail herein as being applied to the assembling of shoe parts into uppers, is of much greater applicability, the method herein described being equally useful in the partitioning of materials into parts such as guiding the cutting of shoe parts from leather, fabric or other materials, or guiding the cutting of clothing parts from textile materials. Furthermore, the invention as herein disclosed may be used in assembling shoe parts by attaching them together by means of stitching apparatus without utilizing any prior cementing operation, the method disclosed herein being utilized in conjunction with apparatus constructed and arranged to project guiding images upon the parts of shoes which are being assembled in the stitching operation. This invention may be further utilized in any industry or art in which it is customary to place marks upon materials preparatory either to the assembling of elements or to the partitioning of the materials into parts.

Therefore, while I have described the assembling of shoe elements into uppers as an instance of the utility of my invention, the method herein described or the equivalent thereof is of wide applicability and I wish it to be understood that the invention is not thereby limited, but that any suitable variations and substitutions may be made within the scope of the appended claims.

I claim:

1. Method of assembling parts to form composite bodies comprising as steps projecting a guiding image of intermingled shaded and illuminated portions upon a work table, placing a part upon the work table in such position that said image will fall thereon, superimposing another part upon the first part, and positioning the two parts in proper relation to each other in accordance with the projected guiding image on the first named part.

2. Method of assembling parts to form composite bodies comprising interposing a pattern in the path of a beam of light, projecting the optical image produced thereby upon a work table, placing a part upon the work table in conformity with the contour of the optical image so that said image will fall thereon, superimposing another part upon the first part also in conformity with the optical image on the first named part, and attaching the parts together.

3. That method of guiding the assembling of elements to form composite bodies comprising as steps projecting guide marks upon a work table, placing an element upon the work table in accordance with the projected guide marks in such position that said image will fall thereon, removably fixing the element firmly to the work table, superimposing a second element upon the first element also in accordance with the guide marks projected upon the first element, and attaching the elements together with adhesive.

4. That method of attaching elements of composite bodies in proper relation to one another comprising as steps clamping an element firmly to a work table, arranging a projecting device so as to cast an optical image of the desired composite body upon said element in such a manner that the contour of the optical image is in registry with said element, and attaching other elements of the composite body to said element in conformity with the optical image cast upon said element thereby reproducing with said elements said optical image.

5. Method of assembling parts of shoes to form an upper comprising providing a pattern, placing said pattern in the path of a beam of light, causing the resulting optical image to fall upon a work table, positioning a shoe part in conformity with the contour of the optical image so that the image will fall thereon, placing other shoe parts in proper relation to the first shoe part in accordance with the optical image on the first part, and fastening the shoe parts together.

6. Method of assembling shoe parts comprising interposing a pattern in the path of a beam of light so as to cast an optical image upon a work table, the pattern being constructed so that the optical image upon the work table is comprised of a shadow the size and shape of a shoe part intersected by thin bands of light which act as luminous guide lines to direct the positioning of another shoe part, placing said first named shoe part on the work table in conformity with the contour of the shadow image, and assembling other shoe parts therewith in accordance with the luminous guide lines which appear on the first named shoe part.

7. Method of assembling shoe parts to form an upper comprising providing a pattern, directing a beam of light upon a work table, placing said pattern in the path of said beam of light so as to cast an optical image of said pattern upon the surface of the work table, said optical image being of substantially the exact size and contour of a shoe part and having within its contour luminous lines which define the desired location of other shoe parts in relation to the first shoe part, placing the first shoe part on the work table in conformity with the contour of the image, locating the shoe parts in conformity with the luminous guide lines at the optical image which appear on the first named shoe part, and attaching the parts together.

8. Method of guiding the assembling of shoe parts by the use of a light transmitting pattern which comprises as steps directing a beam of light upon the surface of a work table, projecting an optical guiding image upon said surface of the work table by interposing said pattern in the path of said beam of light so as to permit only those rays of light which pass through the pattern to reach the surface of the work table, and assembling the shoe parts in accordance with the pattern outlined on the work table by said image.

9. Method of assembling shoe parts which includes as steps providing a pattern comprising sheet material having a design incised therein so as to permit the passage of light through the pattern in a predetermined manner, placing the pattern in the path of a beam of light so that all the light rays in said beam of light are intercepted by the pattern except the light rays which pass through the incisions in the pattern, directing the light rays which pass through the incisions upon the surface of a work table so as to form an optical pattern, upon said surface, and assembling shoe parts on the work table in proper relative position to each other in conformity with the optical pattern formed on the work table by said light rays.

10. Method of assembling shoe parts to form an upper comprising providing a substantially opaque pattern, said pattern being of substantially the exact size and contour of a shoe part and having incisions therein to indicate the location of other shoe parts relative thereto, directing a beam of light upon a work table, interposing said pattern in the path of said beam of light so as to project an optical image upon the work table by utilizing a projection device of a 1-1 ratio whereby said image is of the size and contour of the pattern, and locating the shoe parts relative to each other in accordance with said resultant image.

11. Method of assembling shoe elements comprising as steps providing a transparent support having thereon a photographic image of a shoe pattern, placing said support in a projecting device, so projecting an image of said pattern upon the surface of a work table as to form an optical pattern of substantially the exact size and contour of the shoe pattern, and assembling shoe elements together in conformance with said optical pattern.

12. Method of assembling shoe elements comprising as steps providing a paper pattern having incised guide marks of a predetermined shape, size and location, projecting a light upon a work table, forming an optical image or pattern upon said work table by interposing said pattern between a light and said work table, said optical image or pattern consisting of a shaded area having luminous guiding lines therein, the luminous guiding lines forming a substantially exact image of the guide marks incised in said paper pattern, and assembling shoe elements together in conformance with said luminous guiding lines.

13. Method of assembling elements of shoes to form an upper comprising as steps providing a rectilinear piece of paper of predetermined breadth and length, having incised therein an outline of substantially the exact size and contour of a shoe element and also having incised therein guide marks at a predetermined location such as to indicate the proper relative position of shoe elements with respect to said outline, projecting a light upon a work table and forming an optical pattern upon the work table by interposing the said incised paper between the light and the work table, said optical pattern consisting of a shaded area having luminous lines appearing therein, the luminous lines forming a substantially exact image of said outline and said guide marks, and assembling shoe elements together in conformance with the said optical pattern.

14. Method of assembling elements of shoes to form an upper comprising as steps incising an outline of substantially exact size and contour of a shoe element in a rectilinear sheet of predetermined breadth and length, incising guide marks in said sheet at a predetermined location within said outline so as to indicate the proper relative position of shoe elements with respect to said outline, projecting a light upon a work table, forming an optical pattern upon the work table by interposing the said incised sheet between the light and the work table, said optical pattern consisting of a shaded area having luminous lines appearing therein, the luminous lines forming a substantially exact image of said outline and said guide marks incised in said sheet, positioning a shoe element upon the surface of the work table in conformity with the contour of said optical pattern, removably fixing said element firmly to said work table, locating other shoe elements in proper relation to the shoe element removably fixed to the work table in conformity with the luminous guide lines in said optical pattern, and attaching the elements together with adhesive.

15. Apparatus for use in assembling composite bodies comprising, in combination, means for projecting an optical image of an element of said body toward a work supporting surface and mechanism for removably fixing an element upon said surface in conformity with said optical image.

16. Apparatus for use in assembling shoes comprising means for projecting an optical image of a shoe part toward a surface, means for removably fixing a shoe part upon said surface in conformity with said optical image, and means for actuating said removably fixing means.

17. An assembling apparatus comprising a work supporting surface, a projecting device constructed and arranged such as to direct light toward said work supporting surface and provided with patterns suitable for interposition in the path of said light such as to cast an optical image of said pattern upon said surface, means for removably fixing elements of work to said surface in conformity with said image, and means for actuating said removably fixing means.

18. Apparatus for use in assembling shoes comprising, in combination, a work supporting surface having constructed and arranged thereon a means for removably fixing an element of a shoe thereto, a mechanism for actuating said removably fixing means, a projecting device constructed and arranged such as to cast an optical image upon said work supporting surface, and means for adjusting said fixing means in accordance with the image on the surface.

JACOB S. KAMBORIAN.